United States Patent
McMullen et al.

(10) Patent No.: US 8,644,173 B1
(45) Date of Patent: Feb. 4, 2014

(54) MANAGING REQUESTS IN A WIRELESS SYSTEM

(75) Inventors: Michael P. McMullen, Leawood, KS (US); Rodney D. Nelson, Overland Park, KS (US)

(73) Assignee: Sprint Communications Company L.P, Overland Park, KS (US)

( * ) Notice: Subject to any disclaimer, the term of this patent is extended or adjusted under 35 U.S.C. 154(b) by 1213 days.

(21) Appl. No.: 12/434,895

(22) Filed: May 4, 2009

Related U.S. Application Data

(63) Continuation-in-part of application No. 12/363,336, filed on Jan. 30, 2009, now abandoned.

(51) Int. Cl.
*H04L 12/26* (2006.01)

(52) U.S. Cl.
USPC ............ 370/252; 370/328; 370/349; 370/389

(58) Field of Classification Search
USPC .................. 370/230, 252, 328, 389, 349; 455/414.1, 456.1, 456.3
See application file for complete search history.

(56) References Cited

U.S. PATENT DOCUMENTS

| | | | |
|---|---|---|---|
| 2004/0176104 A1* | 9/2004 | Arcens | 455/456.3 |
| 2007/0010942 A1* | 1/2007 | Bill | 701/209 |
| 2007/0099626 A1* | 5/2007 | Lawrence et al. | 455/456.1 |
| 2007/0136785 A1* | 6/2007 | Warrier et al. | 726/2 |
| 2008/0259791 A1* | 10/2008 | Synnestvedt et al. | 370/230 |
| 2010/0087179 A1* | 4/2010 | Makavy et al. | 455/418 |
| 2010/0124910 A1* | 5/2010 | Eich | 455/414.1 |

OTHER PUBLICATIONS

Krazit, Tom; http://news.cnet.com/8301-1035_3-10049117-94.html—Sep. 23, 2008.
http://www.universefirefox.com/add-ons/limit-bandwidth-usage-in-firefox-firefox-throttle—Jan. 30, 2008.
http://www.darkgovernment.com/news/comcast-tries-to-throttle-internet-usage/—Sep. 1, 2008.
Hodgkins, Kelly; http://www.boygeniusreport.com/2008/09/29/sprint-may-throttle-wimax/—Sep. 29, 2008.

* cited by examiner

*Primary Examiner* — Brian D Nguyen
*Assistant Examiner* — Toan Nguyen

(57) ABSTRACT

Systems, methods, and computer-readable media for managing location-based requests in a wireless system are provided. In embodiments, a request includes or is associated with a source identifier. A position determining entity (PDE) is configured to receive a request at a designated port based on the associated source identifier. A counting component counts the number of requests communicated for a particular source identifier while a timer times predetermined units of time. A usage policy determines the maximum threshold of requests that may be communicated for a source identifier in a predetermined time period. The request may be granted if the number of requests communicated is below the maximum threshold. The request may be denied or granted if the number of requests communicated is above the maximum threshold.

20 Claims, 4 Drawing Sheets

MANAGING REQUESTS IN A WIRELESS SYSTEM

CROSS-REFERENCE TO RELATED APPLICATIONS

This Application is a continuation-in-part of U.S. application Ser. No. 12/363,336 filed Jan. 30, 2009, now abandoned, entitled "MANAGING REQUESTS IN A WIRELESS SYSTEM," the teachings of which are hereby incorporated by reference in their entirety.

SUMMARY

Embodiments of the invention are defined by the claims below, not this summary. A high-level overview of various embodiments of the invention are provided here for that reason, to provide an overview of the disclosure, and to introduce a selection of concepts that are further described in the detailed description below. This summary is not intended to identify key features or essential features of the claimed subject matter, nor is it intended to be used as an aid in isolation to determine the scope of the claimed subject matter.

In a first embodiment, a wireless system is configured to manage location-based requests. The system includes a position determining entity (PDE) that receives the location-based request from mobile devices that are wirelessly connected to the PDE via a wireless telecommunications network. The PDE includes a designated port that receives the location-based requests based on a source identifier associated with the location-based request, a counting component that counts the location-based requests received at the designated port, a timer that times a predetermined unit of time for the designated port, wherein the predetermined unit of time allows the PDE to balance a reception rate for location-based requests received from each mobile device, and a database that stores usage policies, counts received from the counting component, and elapsed time received from the timer.

In other embodiments, a set of computer-useable instructions are executed by a processor to provide a method for managing location-based requests in a wireless system. The method includes receiving at least one location-based request at a PDE. The PDE identifies the location-based request based on the source identifier that is associated with the location-based request. The location-based request is automatically correlated with a usage policy. The usage policy designates a number of requests allowed within a predetermined unit of time. The PDE determines whether the usage policy allows the request. Based on a determination that the usage policy allows the location-based request, the request is granted.

In still further embodiments, a set of computer-useable instructions are executed by a processor to provide a method for managing location-based requests in a wireless system. The method includes receiving at least one request that is associated with a source identifier. Based on the source identifier, the source from which the request was communicated is identified. The request is received at a specific designated port that is associated with the source identifier. The request is automatically correlated with a usage policy. The usage policy designates a number of requests allowed within a predetermined unit of time that are associated with a particular source identifier and received at the designated port. It is then determined whether the number of received requests within a predetermined unit of time is above a maximum threshold. Based on a determination that the usage policy allowing the request, the request is granted. Based on a determination that the usage policy does not allow the request, the request is denied.

BRIEF DESCRIPTION OF THE SEVERAL VIEWS OF THE DRAWINGS

Illustrative embodiments of the invention are described in detail below with reference to the attached drawing figures, and wherein.

DETAILED DESCRIPTION

Figure 1:
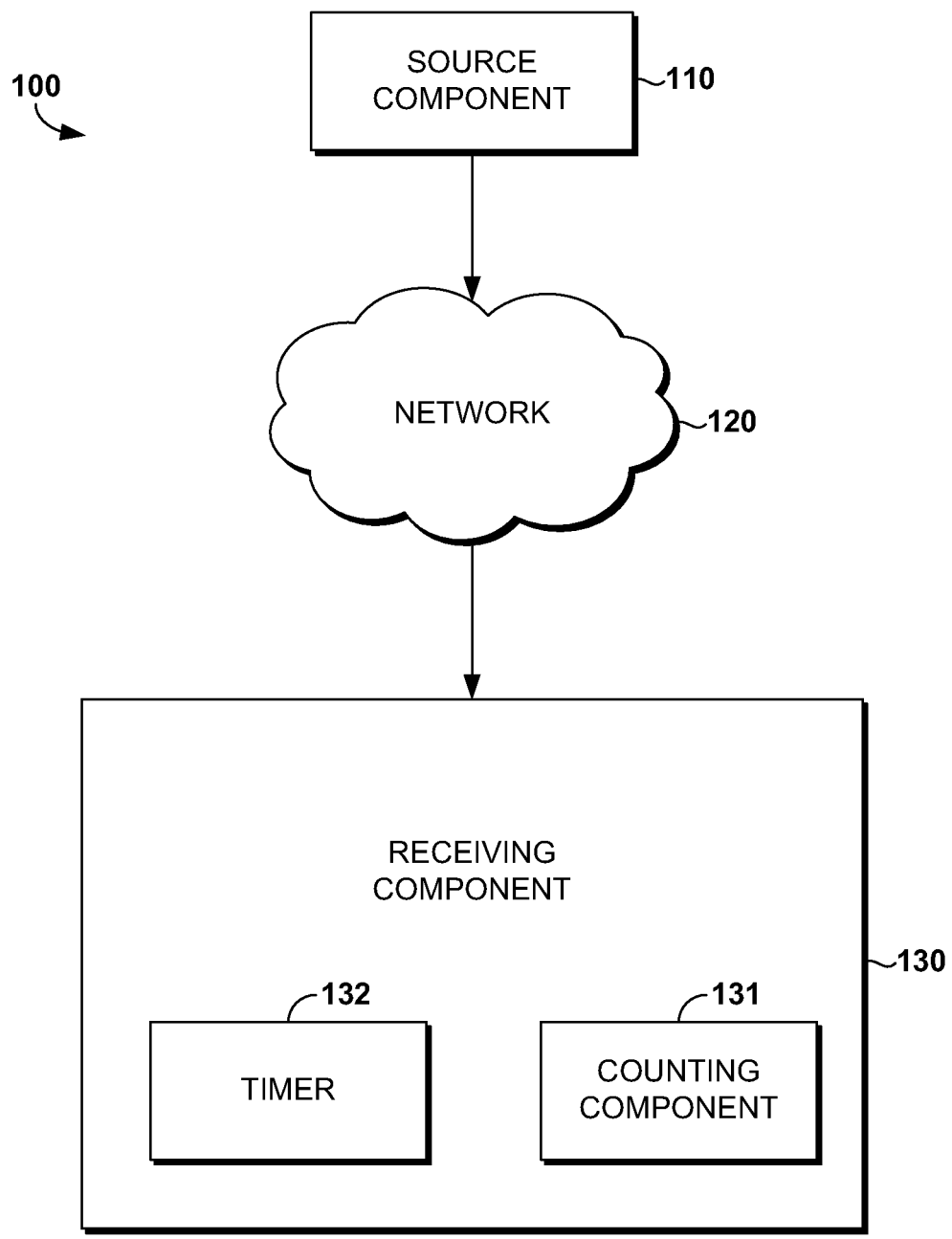
FIG. 1 is a block diagram of an exemplary wireless system for managing requests, in accordance with an embodiment of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" or "block" might be used herein to connote different acts of methods, the terms should not be interpreted as implying any particular order among or between various acts herein disclosed unless and except when the order of individual acts is explicitly described.

Throughout this disclosure, several acronyms and shorthand notations are used to aid the understanding of certain concepts pertaining to the associated embodiments. These acronyms and shorthand notations are solely intended for the purpose of providing an easy methodology of communicating the ideas expressed herein and are in no way meant to limit the scope of embodiments of the invention. The following is a list of these acronyms:

| | |
|---|---|
| 2G | $2^{nd}$ Generation Radio Access |
| 3G | $3^{rd}$ Generation Radio Access |
| 4G | $4^{th}$ Generation Radio Access |
| CDMA | Code Division Multiple Access |
| CD-ROM | Compact Disk Read Only Memory |
| DVD | Digital Versatile Discs |
| EEPROM | Electrically Erasable Programmable Read Only Memory |
| GPRS | General Packet Radio Services |
| GSM | Global System for Mobile Communication |
| IEEE | Institute of Electrical and Electronics Engineers |
| IP | Internet Protocol |
| LAN | Local Area Network |
| MDN | Mobile Directory Number |
| MO | Mobile Originated |
| PC | Personal Computer |
| PDA | Personal Digital Assistant |
| PDE | Position Determining Entity |
| RAM | Random Access Memory |
| RAN | Radio Area Network |
| ROM | Read Only Memory |

| | |
|---|---|
| TD-SCDMA | Time Division-Synchronous Code Division Multiple Access |
| VOIP | Voice-Over-IP |
| WAN | Wide Area Network |
| WCDMA | Wideband Code Division Multiple Access |
| WiMAX | Worldwide Interoperability for Microwave Access |

Embodiments of the invention may be embodied as, among other things, a method, system, or a computer-program product. In one embodiment, a computer-program product that includes computer-useable instructions is embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Referring to the drawings generally, and initially to FIG. 1 in particular, an exemplary wireless system 100 for managing requests is illustrated. A request, as used herein, refers to a request communicated from at least one source component 110 to one or more receiving components 130 to obtain data relating to a position or a geographical location. For example, a request may inquire about the weather for a particular zip code. The request is associated with a source identifier. The source identifier may be a mobile directory number (MDN), a wireless directory number, a serial number, an application identifier, or the like. The MDN, wireless directory number and serial number identify the device from which the request is communicated. The application identifier, however, identifies the specific application communicating the request. In the present example, a request inquiring about the weather for a particular zip code would be communicated from a weather application or the like. Thus, system 100 may be configured to identify a source component 110 at the device level, the application level, and the like.

Source component 110 may be throttled to a particular usage based on a number of requests communicated in a predetermined period of time. A source component 110 that generates requests may be monitored by a receiving component 130 configured to receive requests and identify said requests based on a source identifier associated with the request. The receiving component 130 may receive requests at a designated port for a designated source identifier. Designated ports enable an administrator to easily manage requests communicated from a particular source component. For example, all requests communicated from source component A may be received at Port A which may simplify tracking of communicated requests.

As shown in FIG. 1, an exemplary system 100 includes a source component 110, a network 120, a receiving component 130, a counting component 131, and a timer 132. Source component 110 of FIG. 1 can be any computing device that is capable of communicating a request. As such, the source component 110 may take on a variety of forms, such as a personal computer (PC), a laptop computer, a mobile phone, a personal digital assistant (PDA), a server, or any other device that is capable of communicating a request. In one embodiment, source component 110 is a mobile device communicating via a wireless telecommunications network, such as a radio area network (RAN). Requests that are sent from a mobile source component that uses wireless telecommunications are said to be mobile originated (MO) and are generally identified by a MDN. Messages sent from a server source component or other computing device, on the other hand, are typically identified by an internet protocol (IP) address and/or an application identifier.

Source component 110 communicates requests by way of network 120. Network 120 could be wired, wireless, or both. Network 120 can include multiple networks, as well as being a network of networks, but is shown in more simple form so as to not obscure other embodiments of the invention. For example, network 120 may include one or more wide area networks (WANs), one or more local area networks (LANs), one or more radio area networks (RANs), one or more public networks, such as the Internet, and/or one or more private networks. In one embodiment, network 120 includes at least a portion of a wireless telecommunications network. Network 120 might include an array of devices, which are not shown so as to not obscure more relevant embodiments of the invention. In a wireless telecommunications network, components such as a base station, a communications tower, or even access points (as well as other components) can provide wireless connectivity in some embodiments. Although single components are illustrated for clarity, one skilled in the art will appreciate that network 120 can enable communication between multiple source components, receiving components, counting components, or timers.

In embodiments, a request communicated from the source component 110 may include, or be associated with, a source identifier. The source identifier may be a MDN, a wireless directory number, a serial number, an application identifier, and the like. Source component 110 may be associated with multiple identifiers. For example, a single source component may run multiple applications. Thus, each application would be associated with a different application identifier.

The request may be received and identified by receiving component 130 based on the source identifier. Receiving component 130 may be any device capable of receiving requests. As such, receiving component 130 may take on a variety of forms, such as a personal computer (PC), a laptop computer, a mobile phone, a personal digital assistant (PDA), a server, or any other device that is capable of communicating a request. In one embodiment, the receiving component may be a position determining entity (PDE). A PDE, as used herein, refers to a geographical position server that determines the position or geographical location of various mobile devices and provides position or geographical location information related to the request.

Receiving component 130 may be configured to receive the requests based on the source identifier associated with the request. Receiving component 130 may include designated ports to receive the requests based on an associated source identifier such that requests associated with a particular source identifier are received at a designated port for the source identifier. A designated port, as used herein, may be any port capable of receiving a request. By way of example only, Port A may be configured to receive all requests associated with source identifier A while all requests associated with source identifier B may be received at Port B.

Receiving component 130 may automatically correlate a received request with a usage policy associated with the request. A usage policy designates a number of requests allowed within a predetermined unit of time and is used by receiving component 130 in a determination of whether a received request will be allowed or denied. The usage policy provides a reference of restrictions associated with a particular source identifier or received at a designated port. The restrictions may be designated by a predetermined unit of time. The predetermined unit of time may be configured by an administrator and may be changed at any time. The usage policy may also illustrate the number of requests allowed within a predetermined unit of time that are associated with a particular source identifier and received at a designated port.

Counting component 131 counts the number of requests received at receiving component 130. Counting component may maintain a separate count of location-based requests received for each individual designated port. Receiving component 130 manages requests associated with a source identifier and throttles the usage of source component 110 or a particular user based on the results of counting component 131 with reference to the restrictions illustrated by the usage policy. For instance, an application associated with a request may be designated by a usage policy to be throttled at ten requests per ten minutes. Counting component 131 will have kept track of each request associated with that particular source identifier to throttle requests based on the usage policy. In an alternate embodiment, counting component 131 may be a separate component of system 100 rather than an integrated component of receiving component 130.

To throttle usage per unit of time, a timer 132 associated with an independent timing thread may complement counting component 131. Timer 132 may be configured to time predetermined units of time for designated ports. By way of example only, timer 132 may be configured to time one hour intervals for a particular designated port that is throttled on usage per one hour while timer 132 may be configured to time one minute intervals for a particular designated port that is throttled on usage per minute. When the predetermined period of time ends, timer 132 may reset and begin timing a new time interval. Counting component 131 may be configured to reset a count of received requests upon a reset of timer 132. Thus, when timer 132 resets and begins timing a new time interval, counting component 131 may reset and begin a new count of received requests. For instance, a usage policy allowing ten requests per ten minutes will reset timer 132 after ten minutes and the total number of requests received, calculated by counting component 131, may also be reset to begin a new calculation for the new time interval.

In other embodiments, timer 132 may be configured to include a secondary timer with an independent timing thread. The secondary timer may further enhance the restrictions of a usage policy by providing a second predetermined unit of time. By way of example only, a source component may be allotted ten requests per hour with a secondary timer of one hundred requests per day. Without the secondary timer, the usage policy may designate two hundred forty requests per day (10 requests/hour*24 hours/day). The secondary timer provides added restrictions on a usage policy while allowing flexibility for the source component to allocate requests as desired. Further, a tertiary timer may also be included in system 100 as another timing thread and may operate similar to the secondary timer. In the present example, the tertiary timer may be configured to six hundred requests per week limiting what might have resulted in seven hundred requests per week (100 requests/day*7 days/week). Similar to the secondary timer, the tertiary timer adds further restrictions to the usage policy to ensure system 100 is not overloaded, while still affording flexibility to source component 110.

Timer 132 may be further configured to time predetermined units of time in context with actual time of day for a particular usage policy. In other words, the timer may be adjusted for peak hours or non-peak hours and such an adjustment would be illustrated in an accompanying usage policy. The predetermined period of time may be lengthened or shortened and/or the number of requests allowed may be increased or decreased depending on the actual time of day. By way of example only, a timer may be altered during the actual time of midnight to 6 a.m. for User A. The usage policy may illustrate that User A may be allocated a maximum threshold of one hundred requests per minute with a secondary restriction of three thousand requests per hour from 6 a.m. to midnight. Timer 132 is timing per minute and per hour. From midnight to 6 a.m., the usage policy illustrates that a maximum threshold of one hundred fifty requests per minute may be allowed with a secondary restriction of six thousand seven hundred and fifty requests per hour. Timer restriction 132 is timing per minute and per hour. This is an illustration of an adjustment of a usage policy for non-peak hours.

Such throttling of system 100, as described above, allows flexibility to a user since they are afforded more usage options with a negotiated usage policy. Additionally, throttling usage protects system 100 from overloading by distributing the traffic of requests over periods of time.

The system 100 may also include an electronic storage database (not shown). The electronic storage database may store records of received requests and records of counting component 131 and timer 132. The electronic storage database may be a separate component of system 100 or distributed across each component of system 100.

Figure 2:
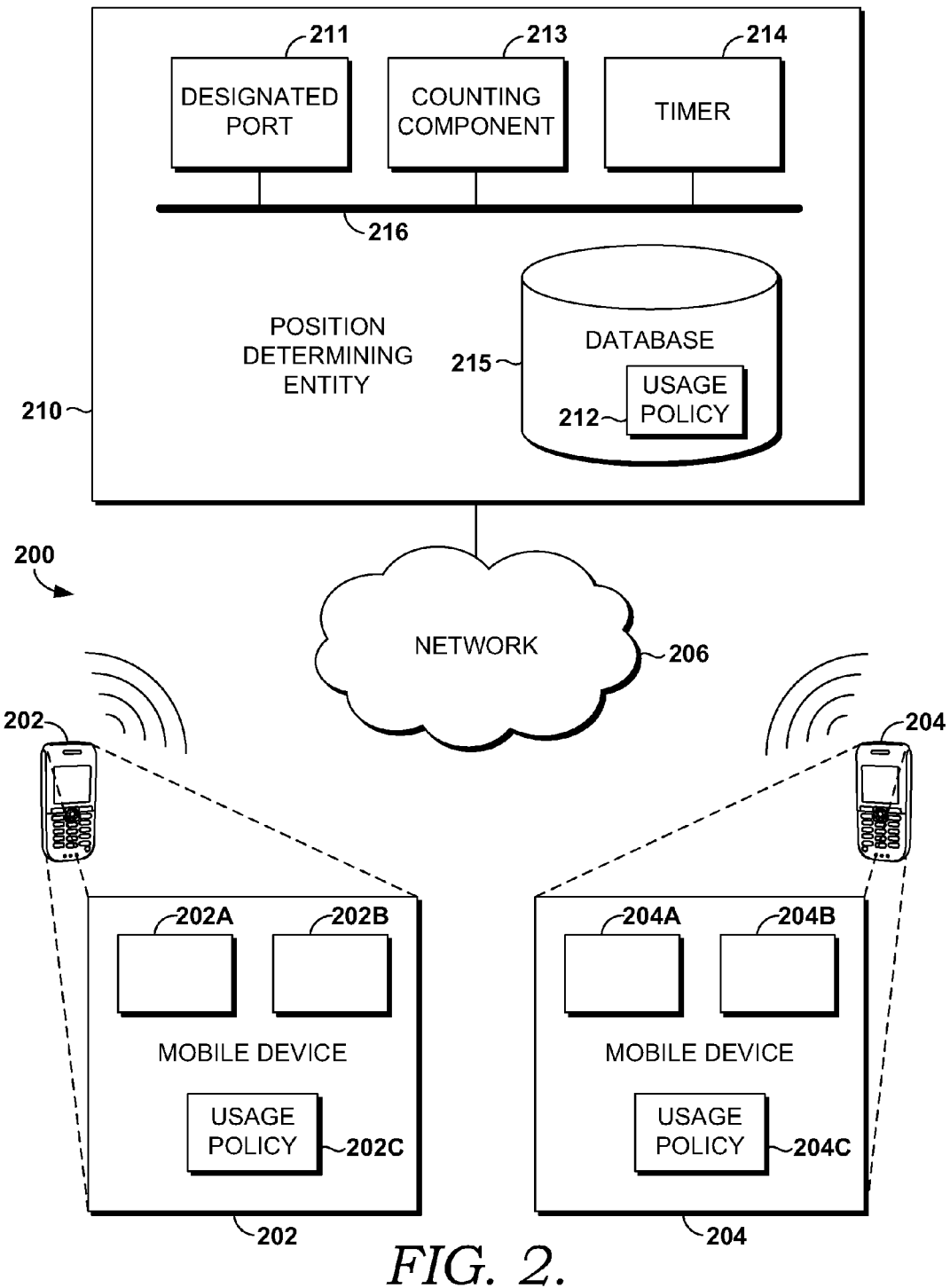
FIG. 2 is a block diagram of an exemplary wireless system for managing requests, in accordance with an embodiment of the invention.

In some embodiments, a radio area network is protected from being overloaded with location-based requests by a position determining entity configured with appropriate usage policies for mobile devices and applications executing on the mobile devices. As shown in FIG. 2, an exemplary wireless system 200 includes mobile devices 202 and 204, wireless telecommunications network 206, and a position determining entity 210. FIG. 2 further includes a bus 216 that directly or indirectly couples the following components: one or more ports 211, one or more counting components 213, and one or more timer 214. Bus 216 represents what may be one or more busses (such as an address bus, data bus, or combination thereof).

Mobile devices 202 and 204 include a mobile phone, a personal digital assistant (PDA), or any device that is capable of wirelessly communicating a request via a wireless telecommunications network 206. In some embodiments, mobile devices 202 and 204 wirelessly communicate location-based requests to the PDE 210 by way of radio area network 206.

A location-based request communicated from mobile device 202 or 204 may include, or be associated with, a source identifier. The source identifier may be a MDN, a wireless directory number, a serial number, an application identifier, or the like. The location-based requests may be received and identified by PDE 210 based on the source identifier. Mobile devices 202 and 204 may be associated with one or more source identifiers. For example, mobile device 202 may run multiple applications as illustrated by applications 202*a* and 202*b*. Similarly, mobile device 204 may execute applications 204*a* and 204*b*. Each application is associated with a different application identifier. The applications 202*a*, 202*b*, 204*a* and 204*b* can be a family finder application, an employee finder application, a navigation application, or any application requiring location information. A family finder application, as used herein, refers generally to an application of a mobile device that allows the mobile device to request information relating to the location of another mobile device. For instance, a telecommunications subscriber may enroll numerous mobile devices in a family finder application subscription and may request location information relating to any one of the enrolled mobile devices. An employee finder application is an application that allows an employer to request location information for various mobile devices associated with employees that subscribe to the employee finder application. A navigation application is likely a map-based application but may be any application relating to navigational information.

Network 206 connects mobile devices 202 and 204 to the PDE 210, transmits location-based requests from mobile devices 202 and 204 to the PDE, and facilitates communication between mobile devices 202 and 204. Network 206 can include multiple networks, as well as being a network of networks, but is shown in more simple form so as to not obscure other embodiments of the invention. Network 206 may include base stations, gateways, communications antennas, and access points. Network 206 may employ a plurality of wireless access technologies including, but not limited to, $2^{nd}$ (2G), $3^{rd}$ (3G), $4^{th}$ (4G) generation radio access, Code Division Multiple Access ("CDMA"), Wideband CDMA ("WCDMA"), Time Division-Synchronous CDMA ("TD-SCDMA"), Global System for Mobile communication (GSM), and Worldwide Interoperability for Microwave Access (WiMAX) to enable wide area coverage for mobile devices 202 and 204 with various degrees of mobility. Network 206 may also provide services via various protocols including General Packet Radio Services (GPRS), Voice-Over-IP (VoIP), and Institute of Electrical and Electronics Engineers (IEEE) 802.11.

PDE 210 receives the location-based requests from the mobile devices 202 and 204. The location-based request may request the location of another mobile device or the location of a point of interest. The PDE 210 responds to the location-based request with the location data for the mobile device or the point of interest specified in the location-based request. In some embodiments, the location data may include a map and navigation instructions.

In some embodiments, PDE 210 may include at least one designated port 211, a usage policy 212, a counting component 213, a timer 214, and a database 215. Designated port 211 is associated with source identifiers. The PDE 210 routes the location-based requests to an appropriate designated port 211 based on the source identifier included in the location-based request. By way of example only, Port A may be configured to receive all location-based requests associated with source identifier A and all location-based requests associated with source identifier B may be received at Port B. Additionally, Port A may be configured to receive all location-based requests associated with application 202a, and Port B may be configured to receive all location-based requests associated with application 202b.

Usage policy 212 allows PDE 210 to throttle location-based requests from mobile devices 202 and 204 and the corresponding applications 202a, 202b, 204a, and 204b. In an embodiment, PDE 210 may automatically correlate a received location-based request with a usage policy 212 using the source identifier associated with the location-based request. Usage policy 212 may specify a location-based request rate for each of mobile devices 202 or 204 or applications 202a, 202b, 204a, 204b as a number of requests allowed within a predetermined unit of time. The PDE 210 may access usage policy 212 to determine whether a received location-based request is allowed or denied. In one embodiment, usage policy 212 is stored in database 215 on PDE 210. Usage policy 212 may provide restrictions associated with a particular source identifier or a designated port 211. The restrictions may specify by a predetermined unit of time and a location-based request rate. The predetermined unit of time may be configured by an administrator and may be changed at any time as negotiated with a mobile device operator at some cost or fee to the mobile device operator. Usage policy 212 also specifies the number of location-based requests—associated with a particular source identifier or received at a designated port—that are allowed within a predetermined unit of time. In some embodiments, mobile devices 202 or 204 store local usage policies 202c and 204c that correspond to the mobile devices 202 or 204 or the applications 202a, 202b, 204a, or 204b. The local usage policies 202c and 204c may be transmitted to the PDE 210 and stored in database 215. In turn, PDE 210 may utilize the received usage policies 202c and 204c to throttle the mobiles devices 202 or 204 or applications 202a, 202b, 204a, or 204b.

Throttling a mobile device 202 or 204 is necessary as the requests received by the PDE 210 are typically costly since a location of another mobile device or a point of interest must be determined each time a location-based request is received by PDE 210. Further, when too many location-based requests are received at once PDE 210 may become overloaded and may not respond to any of the received location-based requests. Thus, usage policies 212, 202c, or 204c that distribute the allocation of location-based requests among mobile devices 202 or 204, and applications 202a, 202b, 204a, or 204b alleviate burdens on the PDE 210. Accordingly, costs for the network provider and user are reduced because the location-based requests are throttled to prevent the PDE 210 from being overloaded.

As location-based requests are received, PDE 210 may identify the location-based request using a source identifier associated with the location-based request. Counting component 213 counts the number of location-based requests received at designated port 211. PDE 210 manages location-based requests associated with each source identifier and throttles the usage of mobile devices 202 and 204 based on the results of counting component 213 with reference to the restrictions included in the usage policies 202c, 204c, or 212. Additionally, applications 202a, 202b, 204a, and 204b may have a usage policy 202c, 204c, or 212 associated with their respective application identifiers. For instance, an application that generates a location-based request may be throttled at ten location-based requests per ten minutes in accordance with a usage policy 202c, 204c, or 212. Counting component 213 counts each location-based request associated with the particular application identifier of the application that generates the location-based request. When the count approaches ten location-based requests within 30 seconds, the PDE 210 throttles requests based on the usage policy to ensure that a minute passes before receiving an eleventh location-based request. In an alternate embodiment, counting component 213 may be a separate component of system 200 rather than a component within the PDE 210.

To throttle usage per unit of time, PDE 210 includes timer 214 that is associated with an independent timing thread that complements counting component 213. In some embodiments, timer 214 may be a separate component of system 200 rather than a component within the PDE 210.

Timer 214 may be configured to time predetermined units of time for designated port 211. By way of example only, timing restriction 214 may be configured to time one hour intervals for designated port 211 that is throttled on usage per one hour while another timing restriction 214 may be configured to time one minute intervals for another designated port that is throttled on usage per minute. When the predetermined period of time ends, timer 214 may reset and begin timing a new time interval. Counting component 213 may be configured to reset a count of received location-based requests upon a reset of the timing restriction 214. Thus, when the timing restriction 214 resets and begins timing a new time interval, the counting component 213 may reset and begin a new count of received location-based requests. For instance, a usage policy 202c, 204c, or 212 allowing ten requests per ten minutes at the particular designated port 211 will reset timer 214 after ten minutes and the total number of location-based requests received calculated by counting component 213 may also be reset to begin a new calculation for the new time interval.

In other embodiments, timer 214 may be configured to include a secondary timer with an independent timing thread. The secondary timer may enhance the restrictions of a usage policy 202c, 204c, or 212 by providing a second predetermined unit of time. By way of example only, mobile device 202 may be allotted ten location-based requests per hour with a secondary timing restriction of one hundred location-based requests per day. Without the secondary timer, the usage policy may designate two hundred forty location-based requests per day (10 requests/hour*24 hours/day). The secondary timer provides added restrictions on a usage policy 202c, 204c, or 212 while allowing flexibility for a mobile device 202 or 204 or application 202a, 202b, 204a, or 204b to generate location-based requests as desired. Further, a tertiary timer may also be included in system 200 as another timing thread and may operate similar to the secondary timer. In the present example, the tertiary timer may be configured to six hundred location-based requests per week limiting what might have resulted in seven hundred location-based requests per week (100 requests/day*7 days/week).

Timer 214 may be further configured to time predetermined units of time in context with actual time of day for a particular usage policy. In other words, the timer 214 may be adjusted for peak hours or non-peak hours and such an adjustment would be specified in a usage policy 212, 202c, or 204c. The predetermined period of time may be lengthened or shortened and/or the number of location-based requests allowed may be increased or decreased depending on the actual time of day. By way of example only, a timer 214 may be altered during the actual time of midnight to 6 a.m. for User A of mobile device 202. The usage policy 212 or 202c may specify that User A of mobile device 202 may be allocated a maximum threshold of one hundred location-based requests per minute with a secondary restriction of three thousand location-based requests per hour from 6 a.m. to midnight. Timer 214 is timing per minute and per hour. From midnight to 6 a.m., the usage policy 212 or 204c may specify that User B of mobile device 204 may be allocated a maximum threshold of one hundred fifty location-based requests per minute with a secondary restriction of six thousand seven hundred and fifty location-based requests per hour. Timer 214 is timing per minute and per hour. This is an illustration of an adjustment of a usage policy 212, 202c, or 204c for non-peak hours. The usage policy may be configured to avoid an overload of system 200 and grant flexibility to mobile devices 202 and 204 during non-peak hours. The system 200 is also alleviated from overload by including a plurality of timing threads.

As described above, the requests received by PDE 210 can easily overload the system if not properly throttled. By throttling mobile devices 202 and 204, users no longer have unlimited access to the PDE 210. Additionally, by implementing usage policies 212, 202c, or 204c, with appropriate restrictions for each mobile device 202 and 204, billing statements are simplified because a user of the mobile device is billed for the negotiated usage policy. The usage policies 212, 202c, or 204c provide flexibility to users of the PDE 210 in specifying future usage levels. Thus, the PDE 210 monitors the location-based requests, throttles users down to a very predictable maximum usage of the PDE 210, and retains simplified billing for each mobile device that generates location-based requests.

Those skilled in the art will appreciate that embodiments of the invention contemplate the presence of additional components and/or subcomponents of systems 100 and 200, and the components and/or subcomponents may be combined with one another and/or separated into new components and subcomponents. In an alternate embodiment, system 100 may be configured to include a separate timing restriction or a separate counting component.

Figure 3:
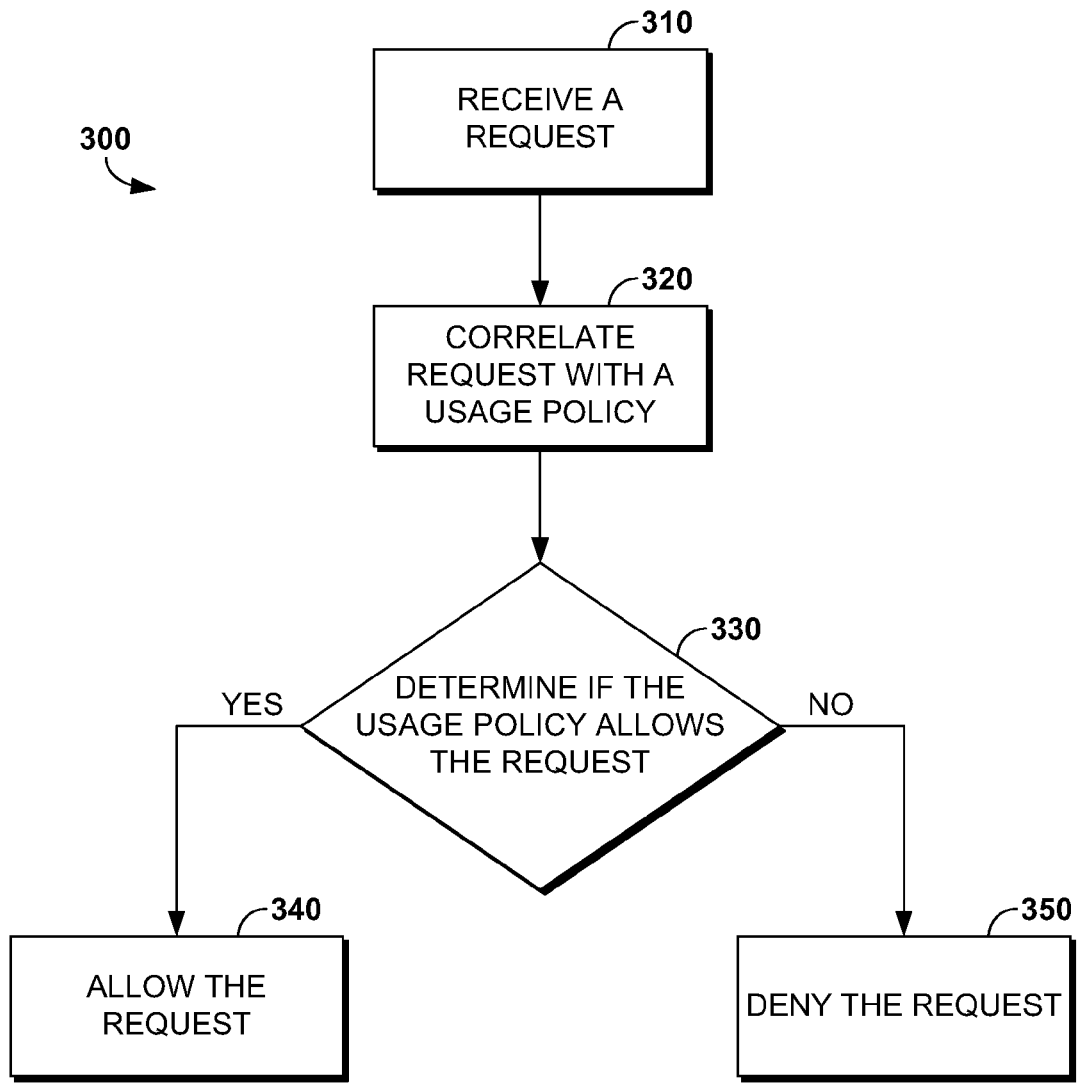
FIG. 3 is a flow diagram illustrating a first exemplary method for managing requests in a wireless system, in accordance with an embodiment of the invention.

A first exemplary method 300 for managing requests by a receiving component in a wireless system is illustrated in FIG. 3. Initially, as illustrated at block 310, a location-based request is received at a PDE. The request may include or be associated with a source identifier. The request may be received at a designated port for the source identifier included or associated with the request. One will appreciate that a variety of components within systems 100 or 200 may receive requests. By way of example only, a counting component may be a front-end counting mechanism rather than a subcomponent of a PDE and may receive the request and then further communicate the request to the PDE.

Once the request is received, the PDE automatically correlates it with a usage policy at block 320. The usage policy illustrates a number of requests allowed within a predetermined unit of time. The PDE may throttle a mobile device's usage limits guided by a maximum threshold illustrated in the usage policy. A determination is then made by the PDE at block 330 of whether the usage policy illustrates allowing the request. If it is determined that the usage policy is satisfied, the request is granted at block 340. If it is determined that the usage policy is not satisfied, the request is denied at block 350.

The usage policy may be satisfied and allow the request if a count of access requests for a predetermined time is below a maximum threshold. The usage policy may be unsatisfied and deny a request if a count of access requests for a predetermined time is above a maximum threshold. The usage policy designates a maximum threshold and access requests above that threshold may generally be denied as a noncompliant request. Each request that is denied may be flagged by the receiving component. A flag, as used herein, refers to any mechanism that has the capability to designate a request from other requests. The designation, or flag, may assist in identifying messages that do not comply with the usage policy in effect.

The PDE may determine that the usage policy may be satisfied and allow the request if a count of access requests for a predetermined time is above a maximum threshold such that a request may be allowed by the PDE even if it is above a maximum threshold. If the PDE grants a request above a maximum threshold, the request may be associated with a flag. The PDE's ability to flag requests allows an administrator to identify needs and possibly negotiate an adjusted usage policy.

Figure 4:
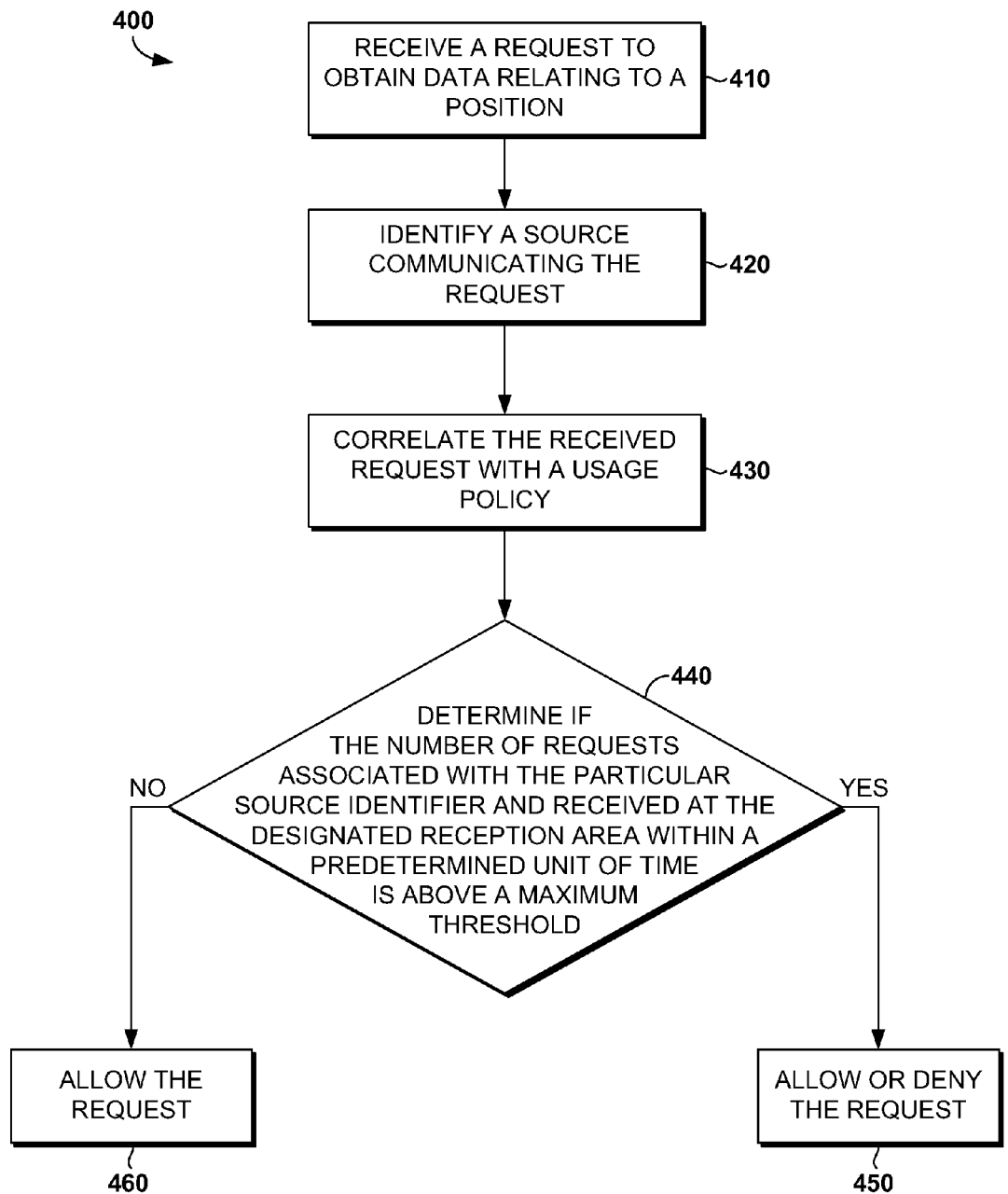
FIG. 4 is a flow diagram illustrating a second exemplary method for managing requests in a wireless system, in accordance with an embodiment of the invention.

A second exemplary method 400 for managing requests in a wireless system is illustrated in FIG. 4. Initially, a request to obtain data relating to a position or location is received at block 410. The request includes or is associated with a source identifier. Based on the source identifier, a source communicating the request is identified at block 420. The request may be received at a designated port for the source identifier included or associated with the request.

Once the request is received, it is automatically correlated with a usage policy at block 430. The usage policy designates a number of requests allowed within a predetermined unit of time that are associated with a particular source and received at a designated port. A mobile device's usage limits may be throttled based on a maximum threshold designated by the usage policy. A determination of whether the number of requests associated with a particular source identifier and received at the designated port is above a maximum threshold for a predetermined unit of time is made at block 440.

A determination that the usage policy is satisfied, i.e. a number of requests associated with a particular source identifier and received at the designated port is not above a maximum threshold for a predetermined unit of time, may result in the request being granted at block 460.

A determination that the number of requests associated with a particular source identifier and received at the designated port is above a maximum threshold for a predetermined unit of time may result in the request being granted or denied at block 450, depending on the designation of the usage policy. If a request is denied, the request is associated with a flag. A flag, as used herein, refers to any mechanism that has the capability to designate a request from other requests. The designation, or flag, may assist in identifying messages that do not comply with the usage policy in effect. All requests that are denied may be flagged.

A usage policy may designate to grant a request even if it is above a maximum threshold. If a request above a maximum threshold is granted, the request may be associated with a flag. All requests may further be stored in a storage database. The storage database may also be configured to only store requests associated with a flag.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

We claim:

1. A system for managing location-based requests, the system comprising:
 a position-determining entity that receives the location-based requests from mobile devices that are wirelessly connected to the position determining entity via a wireless telecommunications network, wherein the position determining entity includes:
  (1) at least one designated port that receives the location-based requests based on a source identifier associated with the location-based request;
  (2) a counting component that counts the location-based requests received at the designated port;
  (3) a timer that times a predetermined unit of time for the designated port and resets at the end of the predetermined unit of time, wherein the predetermined unit of time allows the position determining entity to throttle a reception rate for location-based requests received from each mobile device during the predetermined unit of time; and
  (4) a database that stores usage policies, counts received from the counting component, and elapsed time received from the timer.

2. The system of claim 1, wherein the source identifier comprises a wireless directory number, a serial number, or an application identifier.

3. The system of claim 1, wherein the mobile device executes at least one location-based application.

4. The system of claim 3, wherein the location-based application is a navigation application.

5. The system of claim 1, the position determining entity throttles the location-based requests received from each mobile device at the designated ports.

6. The system of claim 1, wherein the timer is further configured to reset when the predetermined unit of time ends.

7. The system of claim 6, wherein the resetting of the timer causes the counting component to reset a count of the requests received.

8. The system of claim 1, further including a secondary timer.

9. Non-transitory computer-readable media having computer-executable instructions embodied thereon that cause one or more processors to perform a method for managing location-based requests in a wireless system, the method comprising:
 receiving a location-based request at a position determining entity, wherein the location-based request is associated with a source identifier that identifies the source that communicated the location-based request;
 upon receiving the location-based request, automatically correlating the location-based request with a usage policy, wherein the usage policy designates a number of requests allowed within a predetermined unit of time;
 determining if the usage policy correlated with the location-based request allows the location-based request, and
 based on a determination that the usage policy allows the location-based request, granting the location-based request.

10. The method of claim 9, wherein the location-based request is received by the position determining entity to determine a geographical location.

11. The method of claim 9, further comprising denying the location-based request based on a determination that the usage policy does not allow the location-based request and associating a flag with the location-based request that is denied.

12. The method of claim 9, wherein the usage policy is satisfied if a count of access requests for a predetermined unit of time is below a maximum threshold.

13. The method of claim 9, wherein the usage policy illustrates allowing the location-based request if a count of access requests for a predetermined unit of time is above a maximum threshold.

14. The method of claim 13, wherein each location-based request granted above a maximum threshold is associated with a flag.

15. Non-transitory computer-readable having computer-executable instructions embodied thereon that cause one or more processors to perform a method for managing location-based requests in a wireless system, the method comprising:
 receiving a request at a designated port, wherein the request is associated with a source identifier;

based on the source identifier, identifying a source communicating the request;

by way of a processor, upon receiving the request, automatically correlating the request with a usage policy, wherein the usage policy designates a number of requests allowed within a predetermined unit of time that are associated with the source identifier and received at the designated port;

determining if the number of requests associated with the source identifier and received at the designated port within a predetermined unit of time is above a maximum threshold;

based on a determination that the usage policy allows the request, granting the request; and based on a determination that the usage policy does not allow the request, denying the request.

16. The method of claim 15, wherein each request denied is associated with a flag.

17. The method of claim 15, wherein the usage policy is satisfied when a request is below the maximum threshold.

18. The method of claim 15, wherein the usage policy illustrates allowing a request that is above the maximum threshold.

19. The method of claim 18, wherein the request above the maximum threshold is associated with a flag.

20. The method of claim 15, wherein the usage policy does not illustrate allowing a request that is above the maximum threshold.

* * * * *